United States Patent
Huang et al.

(10) Patent No.: US 8,681,110 B2
(45) Date of Patent: Mar. 25, 2014

(54) SENSING CIRCUIT FOR USE WITH CAPACITIVE TOUCH PANEL

(75) Inventors: Yen-Lin Huang, Taipei (TW); Hsin-Hao Wang, Tainan (TW)

(73) Assignee: Orise Technology Co., Ltd., Hsinchu (TW)

( * ) Notice: Subject to any disclaimer, the term of this patent is extended or adjusted under 35 U.S.C. 154(b) by 381 days.

(21) Appl. No.: 12/902,522

(22) Filed: Oct. 12, 2010

(65) Prior Publication Data

US 2011/0090173 A1    Apr. 21, 2011

(30) Foreign Application Priority Data

Oct. 19, 2009    (TW) .............................. 98135295 A (51) Int. Cl.
*G06F 3/044* (2006.01)
(52) U.S. Cl.
USPC .................. 345/173; 178/18.06; 345/174
(58) Field of Classification Search
USPC .............. 345/173–184; 178/18.01–20.04; 324/658–661, 676–679, 686–688, 324/710–712
See application file for complete search history.

(56) References Cited

U.S. PATENT DOCUMENTS

| | | | |
|---|---|---|---|
| 5,565,658 A | | 10/1996 | Gerpheide et al. |
| 5,604,685 A | * | 2/1997 | Seesink et al. .................. 702/86 |
| 5,659,254 A | * | 8/1997 | Matsumoto et al. .......... 324/678 |
| 5,661,240 A | * | 8/1997 | Kemp .......................... 73/514.32 |
| 5,751,154 A | * | 5/1998 | Tsugai ............................ 324/661 |
| 5,841,078 A | | 11/1998 | Miller et al. |
| 5,986,497 A | * | 11/1999 | Tsugai ............................ 327/554 |
| 6,075,520 A | * | 6/2000 | Inoue et al. .................... 345/173 |
| 6,452,514 B1 | | 9/2002 | Philipp |
| 6,744,258 B2 | * | 6/2004 | Ishio et al. ..................... 324/548 |
| 7,129,714 B2 | | 10/2006 | Baxter |
| 7,880,481 B2 | * | 2/2011 | Zangl et al. .................... 324/684 |
| 7,982,471 B2 | * | 7/2011 | Mueck et al. .................. 324/686 |
| 2004/0004488 A1 | | 1/2004 | Baxter |
| 2005/0099188 A1 | * | 5/2005 | Baxter ............................ 324/678 |
| 2006/0273804 A1 | * | 12/2006 | Delorme et al. ............... 324/658 |
| 2008/0303705 A1 | * | 12/2008 | Sakakibara .................... 341/172 |
| 2009/0224775 A1 | * | 9/2009 | Nishizono ...................... 324/658 |
| 2010/0132466 A1 | * | 6/2010 | Spahlinger ................. 73/514.32 |
| 2010/0244858 A1 | * | 9/2010 | Cormier, Jr. ................... 324/678 |

* cited by examiner

*Primary Examiner* — Amr Awad
*Assistant Examiner* — Roberto Flores
(74) *Attorney, Agent, or Firm* — WPAT, PC; Justin King (57) ABSTRACT

A sensing circuit of a capacitive touch panel includes an operation amplifier, a first switch, a second switch, first and second feedback capacitors, a third switch, a fourth switch, a fifth switch and a sixth switch. The operation amplifier includes a positive input terminal, a negative input terminal and an output terminal. A reference voltage is inputted into the positive input terminal. The first switch is connected between a receiving electrode and the negative input terminal. The second switch is connected between the negative input terminal and the output terminal. The third switch is connected to the negative input terminal and the first feedback capacitor. The fourth switch is connected to the first feedback capacitor and the output terminal. The fifth switch is connected to the negative input terminal and the second feedback capacitor. The sixth switch is connected to the second feedback capacitor and the output terminal.

9 Claims, 12 Drawing Sheets

FIG. 9C $\Delta V_o = 6*V_y*C_m/C_i$

SENSING CIRCUIT FOR USE WITH CAPACITIVE TOUCH PANEL

This application claims the benefit of Taiwan application Serial No. 098135295, filed Oct. 19, 2009, the subject matter of which is incorporated herein by reference.

FIELD OF THE INVENTION

The present invention relates to a sensing circuit for use with a touch panel, and more particularly to a sensing circuit for use with a capacitive touch panel.

BACKGROUND OF THE INVENTION

Figure 1:
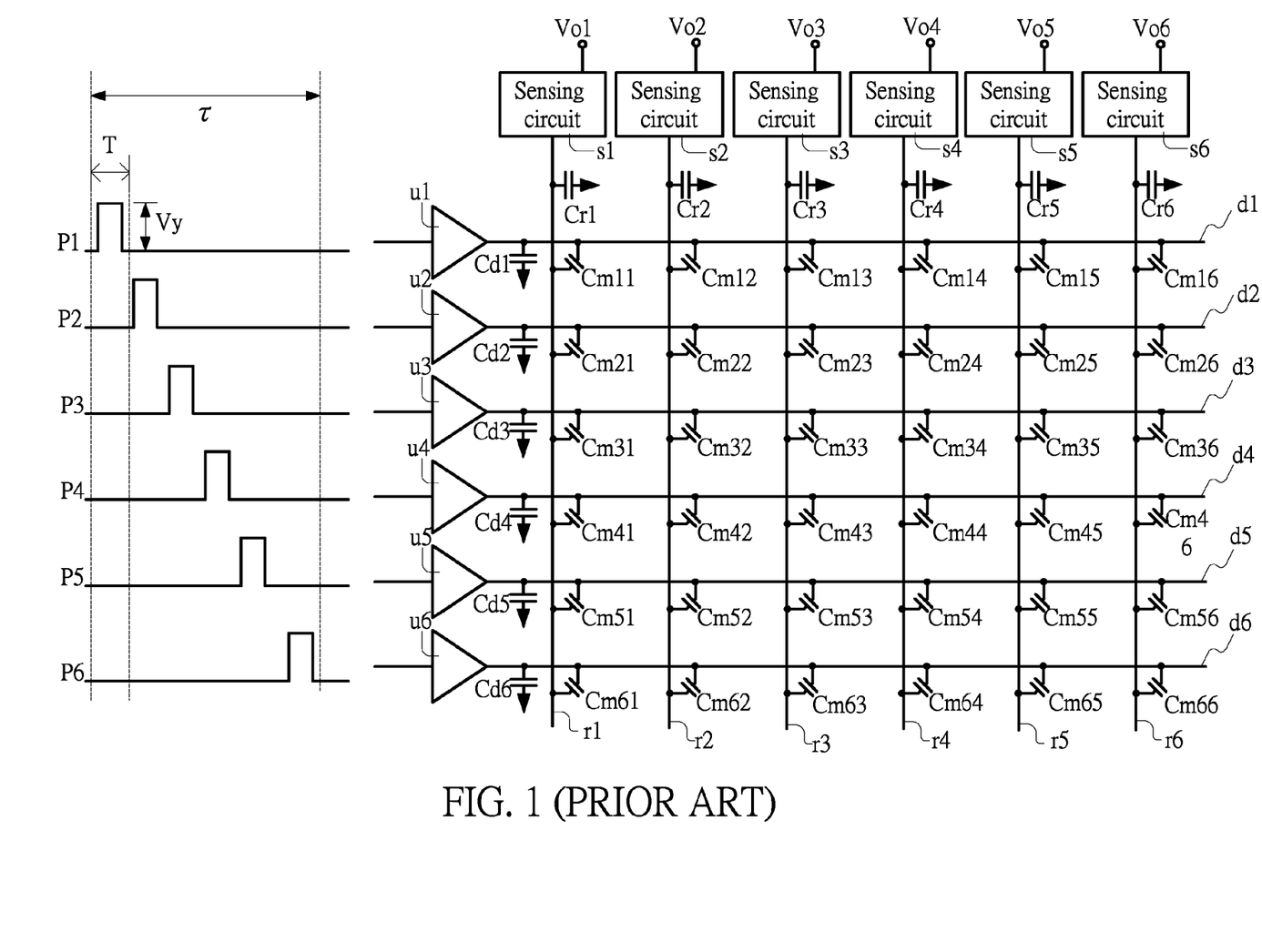
FIG. 1 is a schematic circuit diagram illustrating a capacitive touch panel system according to the prior art.

FIG. 1 is a schematic circuit diagram illustrating a capacitive touch panel system according to the prior art. As shown in FIG. 1, the capacitive touch panel system comprises driving units u1~u6, sensing circuits s1~s6 and a touch panel. The touch panel comprises driving electrodes d1~d6 and receiving electrodes r1~r6, which are not directly connected with each other. The driving electrodes d1~d6 are connected to output terminals of respective driving units u1~u6. The receiving electrodes r1~r6 are connected to input terminals of respective sensing circuits s1~s6. The equivalent capacitances Cd1~Cd6 exist between driving electrodes d1~d6 and the ground. The equivalent capacitances Cr1~Cr6 exist between receiving electrodes r1~r6 and the ground. In addition, mutual capacitances Cm11~Cm66 exist between the driving electrodes d1~d6 and respective receiving electrodes r1~r6. For clarification, six driving electrodes d1~d6 and six receiving electrodes r1~r6 or the touch panel are shown in FIG. 1. The capacitive touch panel with more driving electrodes and more receiving electrodes may have the similar configurations, and is not redundantly described herein.

The capacitive touch panel of FIG. 1 is a multi-finger touch panel. When a conductive pointed object (e.g. a finger) touches the capacitive touch panel, the mutual capacitance value is changed. According to the change of the mutual capacitance value, a touched position is realized. Generally, once the finger of a user is placed on a touch point of the capacitive touch panel, the mutual capacitance value at the touch point is changed. Meanwhile, a driving signal is sent to the corresponding mutual capacitance. In response to the driving signal, the electric quantity stored in the mutual capacitance is correspondingly changed. The change of the electric quantity is detected by the sensing circuit. A backend circuit (not shown) connected to the sensing circuit may realize the position of the touch point according to the change of the electric quantity. Moreover, since the relationship between electric quantity (Q), voltage (V) and capacitance value (C) complies with the equation $Q=C \times V$, the sensing circuit may also provide a voltage change to the backend circuit. The backend circuit may realize the position of the touch point according to the voltage change.

Please refer to FIG. 1 again. The six driving signals P1~P6 will sequentially provide respective pulses to the driving electrodes d1~d6 through the driving units u1~u6. Since the mutual capacitances Cm11~Cm66 are connected between the driving electrodes d1~d6 and respective receiving electrodes r1~r6, the coupling charge of the mutual capacitances Cm11~Cm66 will be transmitted to the sensing circuits s1~s6 through the receiving electrodes r1~r6. As such, output voltages Vo1∥Vo6 are respectively generated by the sensing circuits s1~s6.

For example, the pulse of the first driving signal P1 generated in a driving cycle T will charge the mutual capacitances Cm11~Cm16, which are connected to the first driving electrode d1. The coupling charge of the mutual capacitances Cm11~Cm16 will be transmitted to the sensing circuits s1~s6 through the receiving electrodes r1~r6. Correspondingly, output voltages Vo1~Vo6 are respectively generated by the sensing circuits s1~s6.

Assuming that the touch point is near the mutual capacitance Cm11, the output voltage Vo1 generated by the first sensing circuit s1 is different from the output voltages Vo2~Vo6, which are respectively outputted from the sensing circuits s2~s6. Whereas, assuming that two touch points are respectively near the mutual capacitances Cm11 and Cm16, the output voltages Vo1 generated by the first sensing circuit s1 and the sixth sensing circuit s6 are different from the output voltages Vo2~Vo5, which are respectively outputted from the sensing circuits s2~s5.

In the next driving cycles, the driving signals P2~P6 sequentially provide pulses to the driving electrodes d1~d6. Correspondingly, output voltages Vo1~Vo6 are respectively generated by the sensing circuits s1~s6.

These six driving cycles T are considered to constitute a scanning cycle τ. In other words, after the scanning cycle τ, all areas of the capacitive touch panel have been scanned once. As such, the position of the at least one touch point on the touch panel can be realized.

Figure 2:
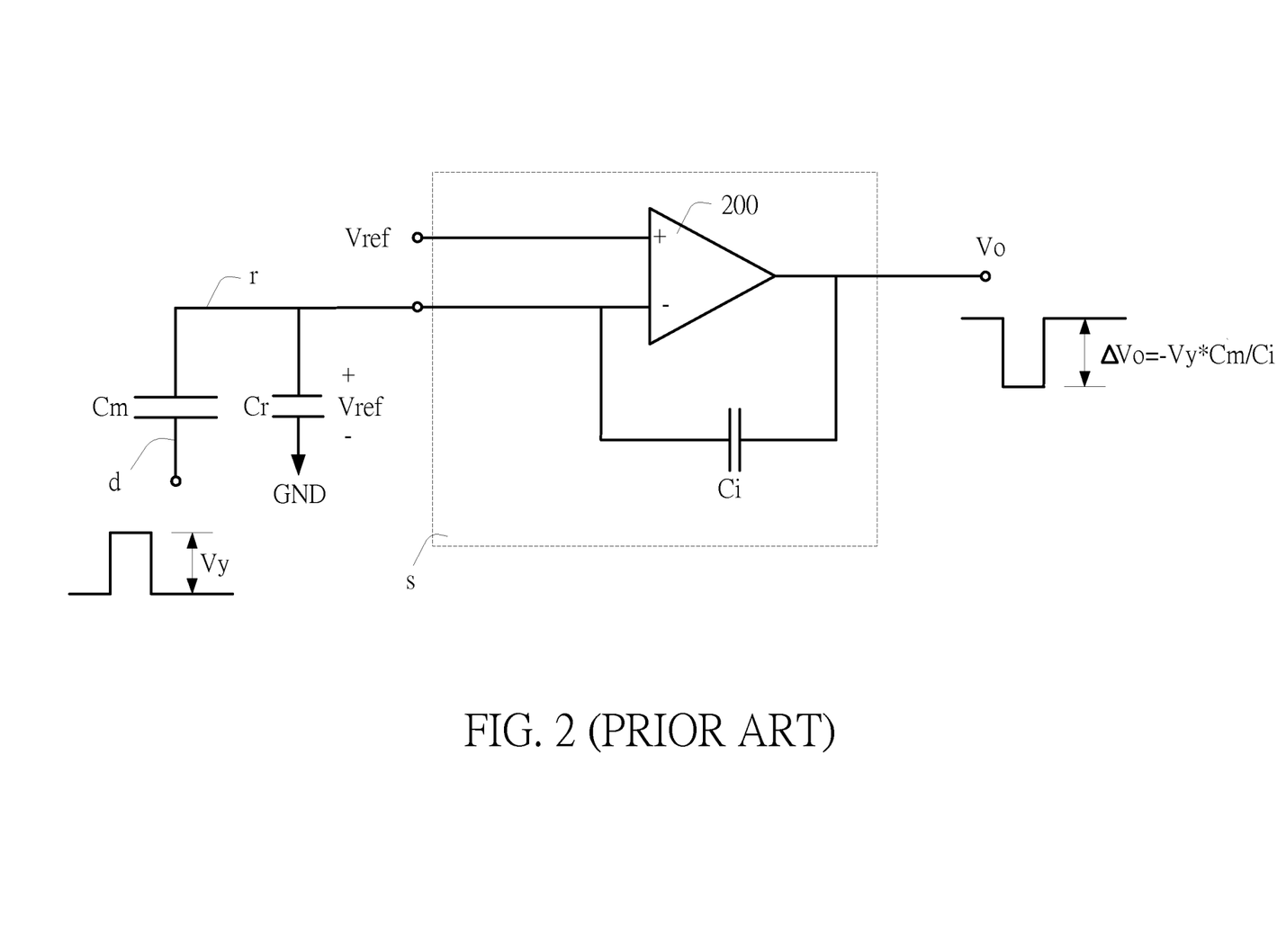
FIG. 2 is a schematic circuit diagram illustrating a sensing circuit of the capacitive touch panel system according to the prior art.

FIG. 2 is a schematic circuit diagram illustrating a sensing circuit of the capacitive touch panel system according to the prior art. As shown in FIG. 2, the sensing circuit s is implemented by an integrator. The sensing circuit s comprises an operation amplifier 200 and a feedback capacitor Ci. A reference voltage Vref is inputted into the positive input terminal (+) of the operation amplifier 200. Both terminals of the feedback capacitor Ci are respectively connected to the negative input terminal (−) and the output terminal Vo of the operation amplifier 200. In addition, the negative input terminal (−) of the operation amplifier 200 is also connected to the receiving electrode r. A mutual capacitance Cm is connected between the receiving electrode r and a driving electrode d. An equivalent capacitance Cr is connected between the receiving electrode r and the ground terminal GND.

During normal operation of the operation amplifier 200, the voltages inputted into the positive input terminal (+) and the negative input terminal (−) of the operation amplifier 200 are equal to the reference voltage Vref. That is, the voltage across the capacitance Cr is equal to the reference voltage Vref. In a case that the amplitude of the pulse passing through the driving electrode d is Vy, the output terminal Vo has a voltage drop ΔVo.

The voltage drop ΔVo is calculated by the equation (I): $\Delta Vo = -Vy \times Cm/Ci$. Take the first driving signal P1 shown in FIG. 1 for example. In a case that no touch point is created, the mutual capacitance values of the mutual capacitances Cm11~Cm16 are unchanged, and thus the voltage drops at the output terminals Vo1~Vo6 of the sensing circuits s1~s6 are identical. On the other hand, if the touch point is near the mutual capacitance Cm11, the mutual capacitance value of the mutual capacitance Cm11 is changed, and thus the voltage drop at the output terminal Vo1 of the first sensing circuit s1 is different from the voltage drops at the output terminals Vo2~Vo6 of the sensing circuit s2~s6. According to the voltage drops at the output terminals Vo1~Vo6 of the sensing circuit s1~s6, the backend circuit may realize the position of the touch point.

If the change of the mutual capacitance value of the mutual capacitance Cm at the touch point is very small, the coupling charge of the mutual capacitance Cm is slightly different from the coupling charge of other mutual capacitances. As such, the voltage drop generated by the sensing circuit corresponding to the touch point is slightly different from the voltage drops generated by other sensing circuits. In this situation, the backend circuit fails to realize the position of the touch point according to the change of the voltage drop.

Figure 3:
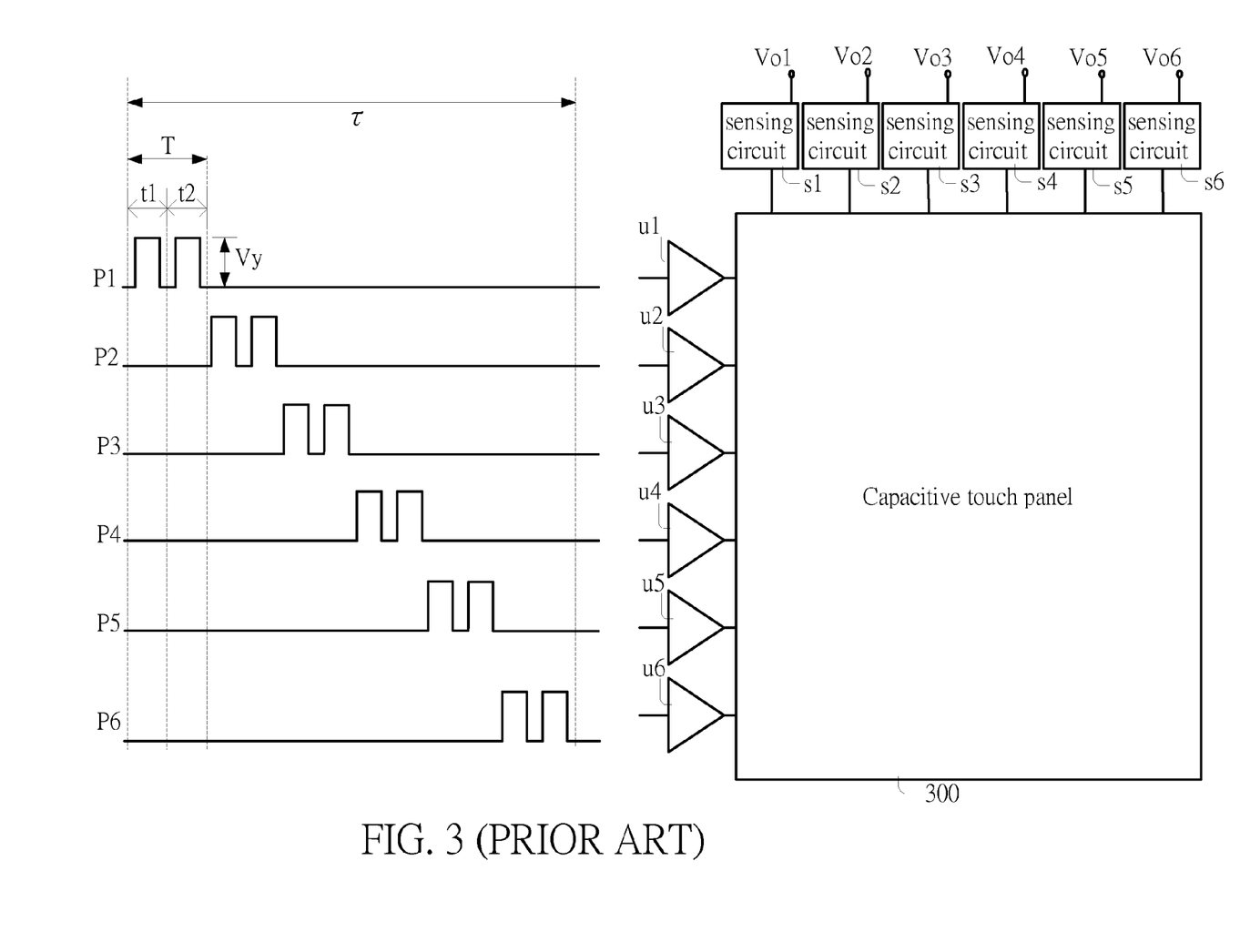
FIG. 3 is a schematic circuit diagram illustrating another capacitive touch panel system according to the prior art.

FIG. 3 is a schematic circuit diagram illustrating another capacitive touch panel system according to the prior art. As shown in FIG. 3, each of the driving signals P1~P6 generates two pulses t1 and t2 in a driving cycle T. In other words, the coupling charge of the mutual capacitances will be generated in several times. The sensing circuits s1~s6 are designed to accumulate the coupling charge of the mutual capacitances in several times. As such, the output voltages Vo1~Vo6 from the sensing circuits s1~s6 are distinguishable.

As shown in FIG. 3, a scanning cycle τ includes six driving cycles T, and two pulses t1 and t2 are generated in each driving cycle T. That is, since each of the driving signals P1~P6 generates two pulses t1 and t2 in each driving cycle T, the coupling charge of the mutual capacitances will be generated in several times. The sensing circuits s1~s6 are designed to accumulate the coupling charge of the mutual capacitances in several times and generate a higher voltage drop for determining the position of the touch point. In other words, after the scanning cycle τ, all areas of the capacitive touch panel have been scanned once. As such, the position of the at least one touch point on the touch panel can be realized.

For clarification, two pulses t1 and t2 generated in each driving cycle T are shown in FIG. 3. It is noted that more than two pulses may be generated in each driving cycle T. As such, the sensing circuits s1~s6 generate a higher voltage drop. The use of multiple pulses to accumulate the coupling charge of the mutual capacitances is disclosed in for example U.S. Pat. No. 6,452,514, which is entitled "Capacitive sensor and array".

SUMMARY OF THE INVENTION

The present invention provides a sensing circuit for use with a capacitive touch panel in order to generate a high voltage drop at the output terminal of the sensing circuit. Since the voltage drop resulted from the touch point and the voltage drop resulted from the untouched point are distinguished, the backend circuit can easily realize the actual position of the touch point according to the change of the voltage drop.

In accordance with an aspect of the present invention, there is provided a sensing circuit for use with a receiving electrode of a capacitive touch panel. A mutual capacitance is connected between a driving electrode of the capacitive touch panel and the receiving electrode. The driving electrode receives a driving signal. The sensing circuit includes an operation amplifier, a first switch, a second switch, a first feedback capacitor, a second feedback capacitor, a third switch, a fourth switch, a fifth switch and a sixth switch. The operation amplifier has a positive input terminal, a negative input terminal and an output terminal. A reference voltage is inputted into the positive input terminal of the operation amplifier. The first switch is connected between the receiving electrode and the negative input terminal of the operation amplifier. The second switch is connected between the negative input terminal and the output terminal of the operation amplifier. The third switch has a first terminal connected to the negative input terminal of the operation amplifier and a second terminal connected to a first terminal of the first feedback capacitor. The fourth switch has a first terminal connected to a second terminal of the first feedback capacitor and a second terminal connected to the output terminal of the operation amplifier. The fifth switch has a first terminal connected to the negative input terminal of the operation amplifier and a second terminal connected to a first terminal of the second feedback capacitor. The sixth switch has a first terminal connected to a second terminal of the second feedback capacitor and a second terminal connected to the output terminal of the operation amplifier. The driving signal generates at least one pulse during a driving cycle. In response to a rising edge of the pulse, the first switch, the second switch, the third switch, the fourth switch, the fifth switch and the sixth switch are controlled, so that the first feedback capacitor is charged in a first charging direction. In response to a falling edge of the pulse, the first switch, the second switch, the third switch, the fourth switch, the fifth switch and the sixth switch are controlled, so that the second feedback capacitor is charged in a second charging direction.

In accordance with another aspect of the present invention, there is provided a sensing circuit for use with a receiving electrode of a capacitive touch panel. A mutual capacitance is existed between a driving electrode of the capacitive touch panel and the receiving electrode. The driving electrode receives a driving signal. The sensing circuit includes an operation amplifier, a first switch, a second switch, a feedback capacitor, a third switch, a fourth switch, a fifth switch and a sixth switch. The operation amplifier has a positive input terminal, a negative input terminal and an output terminal. A reference voltage is inputted into the positive input terminal of the operation amplifier. The first switch is connected between the receiving electrode and the negative input terminal of the operation amplifier. The second switch is connected between the negative input terminal and the output terminal of the operation amplifier. The third switch has a first terminal connected to the negative input terminal of the operation amplifier and a second terminal connected to a first terminal of the feedback capacitor. The fourth switch has a first terminal connected to a second terminal of the feedback capacitor and a second terminal connected to the output terminal of the operation amplifier. The fifth switch is connected between the second terminal of the feedback capacitor and the negative input terminal of the operation amplifier. The sixth switch is connected between the first terminal of the feedback capacitor and the output terminal of the operation amplifier. The driving signal generates at least one pulse during a driving cycle. In response to a rising edge and a falling edge of the pulse, the first switch, the second switch, the third switch, the fourth switch, the fifth switch and the sixth switch are controlled, so that the feedback capacitor is charged in a first charging direction.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 4A:
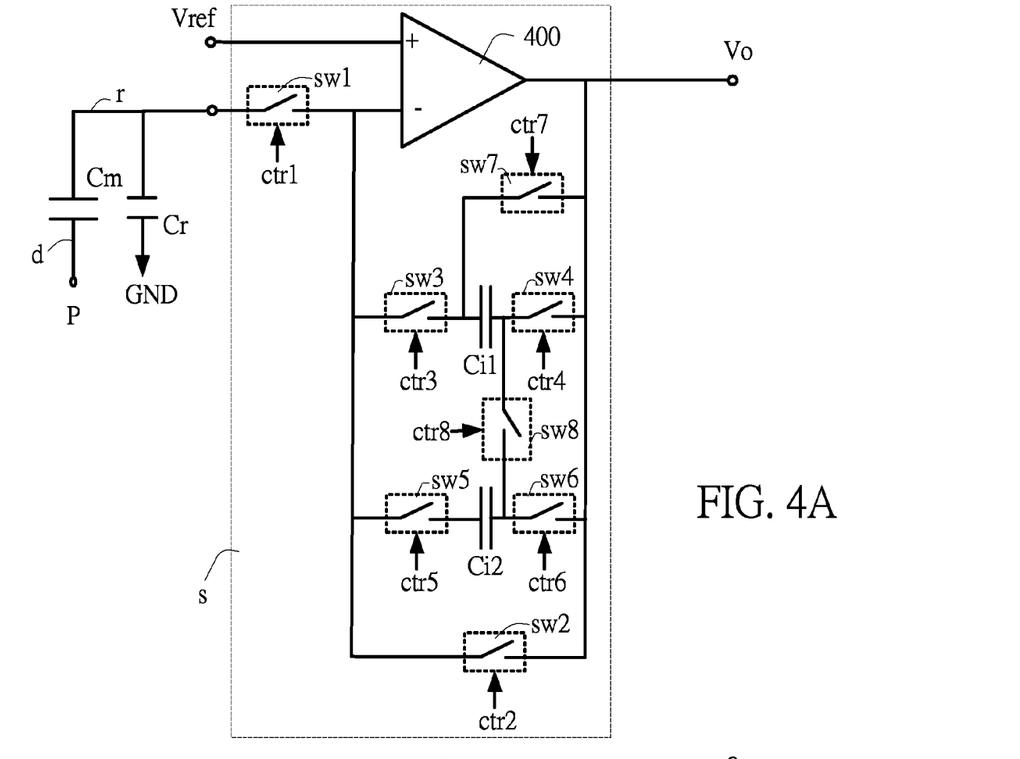
FIG. 4A is a schematic circuit diagram illustrating a sensing circuit according to a first embodiment of the present invention.
Figure 4B:
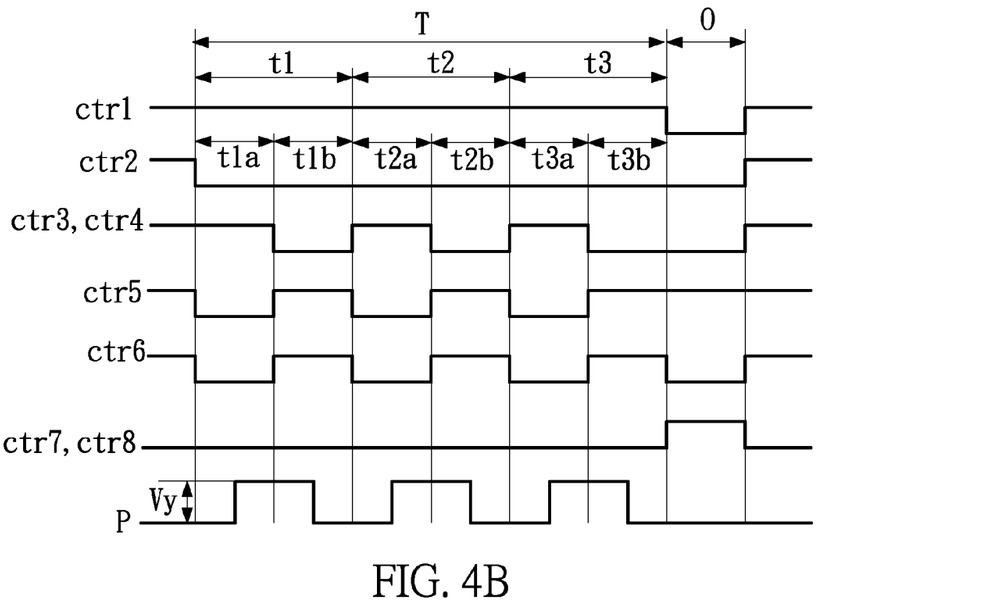
FIG. 4B is a schematic timing waveform diagram illustrating associated signal processing in the sensing circuit shown in FIG. 4A.

FIG. 4A is a schematic circuit diagram illustrating a sensing circuit according to a first embodiment of the present invention. FIG. 4B is a schematic timing waveform diagram illustrating associated signal processing in the sensing circuit shown in FIG. 4A. The sensing circuit s comprises an operation amplifier 400, a first feedback capacitor Ci1, a second feedback capacitor Ci2 and eight switches sw1~sw8.

A reference voltage Vref is inputted into the positive input terminal (+) of the operation amplifier 400. The first switch sw1 is controlled by a first control signal ctr1, and connected between the receiving electrode r and the negative input terminal (−) of the operation amplifier 400. The second switch sw2 is controlled by a second control signal ctr2, and connected between the negative input terminal (−) and the output terminal Vo of the operation amplifier 400. The third switch sw3 is controlled by a third control signal ctr3. A first terminal of the third switch sw3 is connected to the negative input terminal (−) of the operation amplifier 400. A second terminal of the third switch sw3 is connected to a first terminal of the first feedback capacitor Ci1. The fourth switch sw4 is controlled by a fourth control signal ctr4. A first terminal of the fourth switch sw4 is connected to a second terminal of the first feedback capacitor Ci1. A second terminal of the fourth switch sw4 is connected to the output terminal Vo of the operation amplifier 400. The fifth switch sw5 is controlled by a fifth control signal ctr5. A first terminal of the fifth switch sw5 is connected to the negative input terminal (−) of the operation amplifier 400. A second terminal of the fifth switch sw5 is connected to a first terminal of the second feedback capacitor Ci2. The sixth switch sw6 is controlled by a sixth control signal ctr6. A first terminal of the sixth switch sw6 is connected to a second terminal of the second feedback capacitor Ci2. A second terminal of the sixth switch sw6 is connected to the output terminal Vo of the operation amplifier 400. The seventh switch sw7 is controlled by a seventh control signal ctr7, and connected between the second terminal of the third switch sw3 and the output terminal Vo of the operation amplifier 400. The eighth switch sw8 is controlled by an eighth control signal ctr8, and connected between the second terminal of the first feedback capacitor Ci1 and the second terminal of the second feedback capacitor Ci2.

In this embodiment, the first feedback capacitor Ci1 and the second feedback capacitor Ci2 has the same capacitance value, which is equal to Ci/2.

As shown in FIG. 4B, a scanning cycle τ of the driving signal P includes a pre-charge cycle, a driving cycle T and an output cycle O. In each driving cycle T, the driving signal P generates three pulses t1, t2 and t3. The driving cycle T is followed by the output cycle O. The remaindering time is the pre-charge cycle. In response to the high-level states of the eight control signals ctr1~ctr8, the switches sw1~sw8 are in the close states. Whereas, in response to the low-level states of the eight control signals ctr1~ctr8, the switches sw1~sw8 are in the open states. Hereinafter, the operations of the sensing circuit s will be illustrated in more details with reference to FIGS. 4 and 5.

Figure 5A:
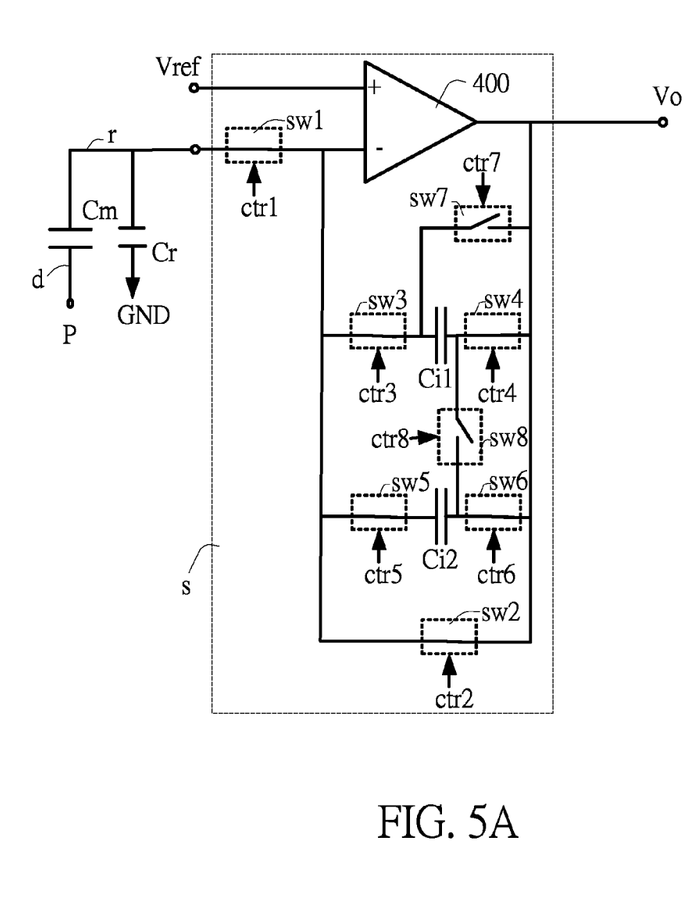
FIG. 5A is a schematic circuit diagram illustrating the sensing circuit of FIG. 4 during the pre-charge cycle.

FIG. 5A is a schematic circuit diagram illustrating the sensing circuit of FIG. 4A during the pre-charge cycle. During the pre-charge cycle, the switches sw1~sw6 are all in the close state, but the seventh switch sw7 and the eighth switch sw8 are in the open state. Since no pulse is generated during the pre-charge cycle and the both terminals of the first feedback capacitor Ci1 and the second feedback capacitor Ci2 are short-circuited, the charge quantity stored in the first feedback capacitor Ci1 and the second feedback capacitor Ci2 will be zero.

Figure 5B:
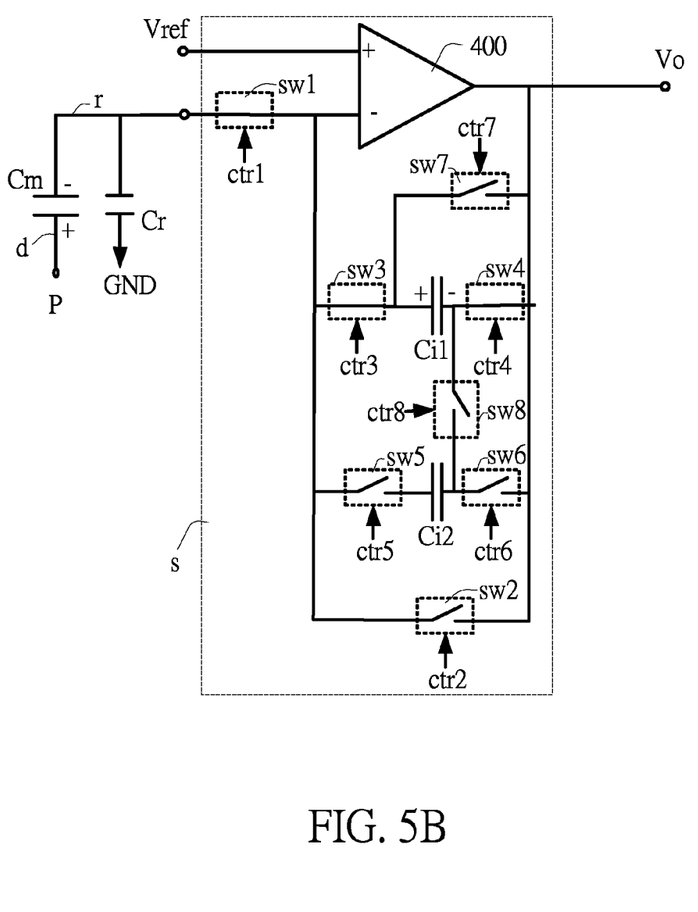
FIG. 5B is a schematic circuit diagram illustrating the sensing circuit of FIG. 4 during the former time interval t1a of the first pulse t1 of the driving cycle T.

FIG. 5B is a schematic circuit diagram illustrating the sensing circuit of FIG. 4A during the former time interval t1a of the first pulse t1 of the driving cycle T. Please refer to FIGS. 4B and 5B. In the former time interval t1a of the first pulse t1, the first pulse t1 is switched from the low-level state to the high-level state. That is, the rising edge of the first pulse t1 is within the former time interval t1a. Meanwhile, the first switch sw1, the third switch sw3 and the fourth switch sw4 are in the close state, but the second switch sw2 and the switches sw5~sw8 are in the open state.

As such, the mutual capacitance Cm generates coupling charge at the rising edge of the first pulse t1. Moreover, since the positive terminal (+) of the mutual capacitance Cm is connected to the driving electrode d and the negative terminal (−) of the mutual capacitance Cm is connected to the receiving electrode r, the first terminal of the first feedback capacitor Ci1 is a positive terminal (+) and the second terminal of the first feedback capacitor Ci1 is a negative terminal (−). According to the equation (I), the voltage drop across the first feedback capacitor Ci1 is obtained as: $\Delta Vo=2\times Vy\times Cm/Ci$.

Figure 5C:
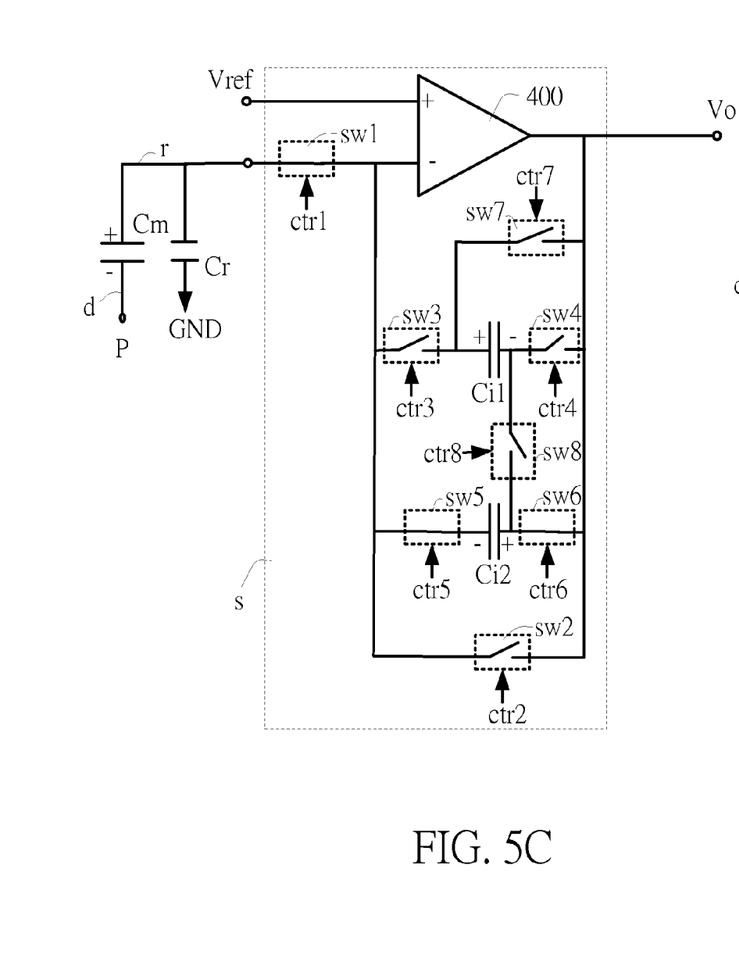
FIG. 5C is a schematic circuit diagram illustrating the sensing circuit of FIG. 4 during the latter time interval t1b of the first pulse t1 of the driving cycle T.

FIG. 5C is a schematic circuit diagram illustrating the sensing circuit of FIG. 4A during the latter time interval t1b of the first pulse t1 of the driving cycle T. Please refer to FIGS. 4B and 5C. In the latter time interval t1b of the first pulse t1, the first pulse t1 is switched from the high-level state to the low-level state. That is, the falling edge of the first pulse t1 is within the latter time interval t1b. Meanwhile, the first switch sw1, the fifth switch sw5 and the sixth switch sw6 are in the close state, but the second switch sw2, the third switch sw3, the fourth switch sw4, the seventh switch sw7 and the eighth switch sw8 are in the open state.

As such, the mutual capacitance Cm generates coupling charge at the falling edge of the first pulse t1. Moreover, since the negative terminal (−) of the mutual capacitance Cm is connected to the driving electrode d and the positive terminal (+) of the mutual capacitance Cm is connected to the receiving electrode r, the first terminal of the second feedback capacitor Ci2 is a negative terminal (−) and the second terminal of the second feedback capacitor Ci2 is a positive terminal (+). According to the equation (I), the voltage drop across the second feedback capacitor Ci2 is obtained as: $\Delta Vo=2\times Vy\times Cm/Ci$.

As is understood from FIGS. 5B and 5C, the first feedback capacitor Ci1 is charged in a first charging direction from the first terminal to the second terminal in response to the rising edge of the first pulse t1 of the driving signal; and the second feedback capacitor Ci2 is charged in a second charging direction from the second terminal to the first terminal in response to the falling edge of the first pulse t1 of the driving signal.

Similarly, during the former time interval t2a of the second pulse t2, the operating condition of the sensing circuit s is similar to that described in FIG. 5B. In addition, the first feedback capacitor Ci1 is charged from the first terminal to the second terminal, and the voltage drop across the first feedback capacitor Ci1 is obtained as: $\Delta Vo=4\times Vy\times Cm/Ci$. Similarly, during the latter time interval t2b of the second pulse t2, the operating condition of the sensing circuit s is similar to that described in FIG. 5C. In addition, the second feedback capacitor Ci2 is charged from the second terminal to the first terminal, and the voltage drop across the second feedback capacitor Ci2 is obtained as: $\Delta Vo=4\times Vy\times Cm/Ci$.

Similarly, during the former time interval t3a of the third pulse t3, the operating condition of the sensing circuit s is similar to that described in FIG. 5B. In addition, the first feedback capacitor Ci1 is charged from the first terminal to the second terminal, and the voltage drop across the first feedback capacitor Ci1 is obtained as: $\Delta Vo=6\times Vy\times Cm/Ci$. Similarly, during the latter time interval t3b of the third pulse t3, the operating condition of the sensing circuit s is similar to that described in FIG. 5C. In addition, the second feedback capacitor Ci2 is charged from the second terminal to the first terminal, and the voltage drop across the second feedback capacitor Ci2 is obtained as: $\Delta Vo=6\times Vy\times Cm/Ci$.

Figure 5D:
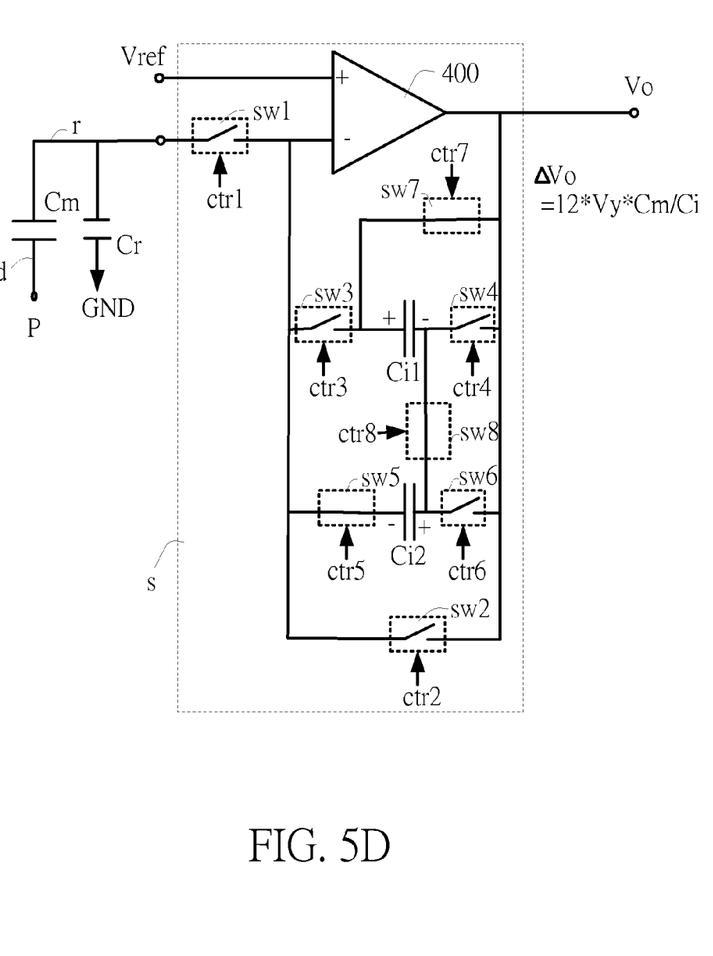
FIG. 5D is a schematic circuit diagram illustrating the sensing circuit of FIG. 4 during the output cycle O.

FIG. 5D is a schematic circuit diagram illustrating the sensing circuit of FIG. 4A during the output cycle O. Please refer to FIGS. 4B and 5D. During the output cycle O, the fifth switch sw5, the seventh switch sw7 and the eighth switch sw8 are in the close state, but the switches sw1~sw4 and the sixth switch sw6 are in the open state.

Obviously, during the output cycle O, the voltage across the first feedback capacitor Ci1 is added by the voltage across the second feedback capacitor Ci2. As such, the voltage drop at the output terminal Vo is obtained as: $\Delta Vo=12\times Vy\times Cm/Ci$. In other words, in a case that N pulses are generated during the driving cycle T, the voltage drop at the output terminal Vo is obtained as: $\Delta Vo=4N\times Vy\times Cm/Ci$.

In the first embodiment, the voltage drop at the output terminal of the sensing circuit s increases during the output cycle. As such, since the voltage drop resulted from the touch point and the voltage drop resulted from the untouched point are distinguished, the backend circuit can easily realize the actual position of the touch point according to the change of the voltage drop.

Figure 6A:
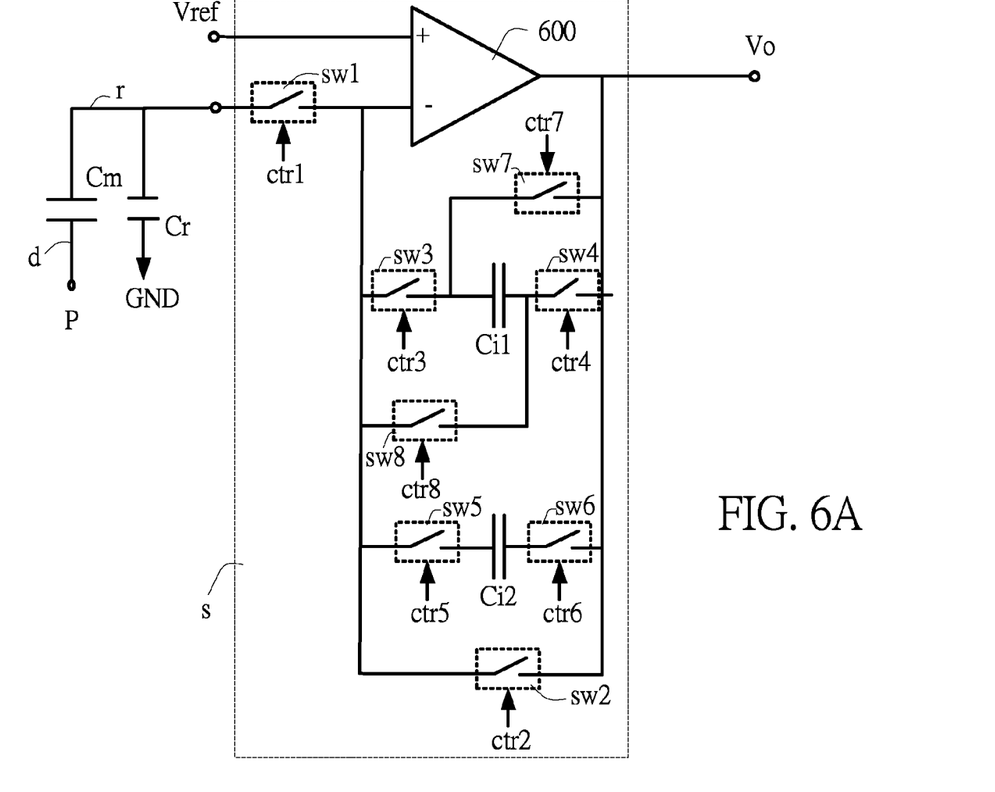
FIG. 6A is a schematic circuit diagram illustrating a sensing circuit according to a second embodiment of the present invention.
Figure 6B:
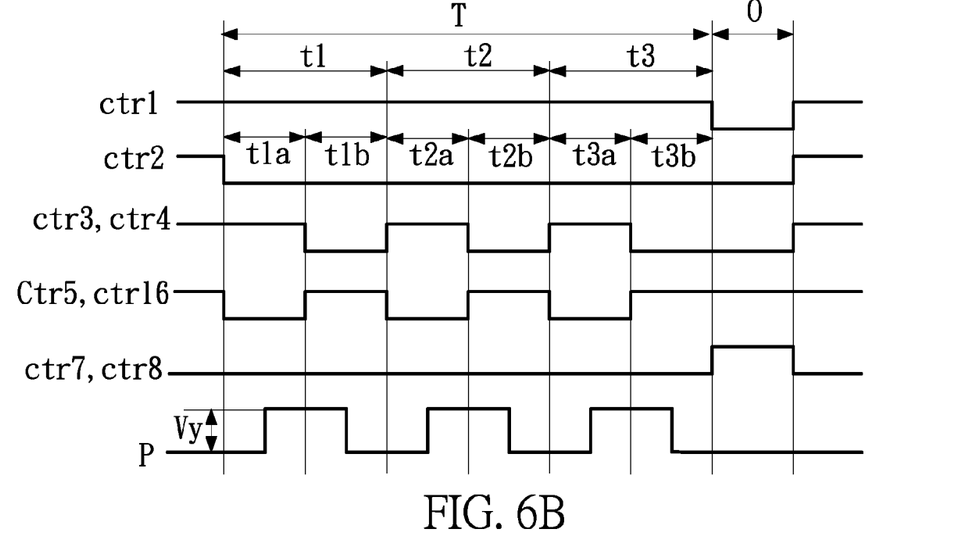
FIG. 6B is a schematic timing waveform diagram illustrating associated signal processing in the sensing circuit shown in FIG. 6A.

FIG. 6A is a schematic circuit diagram illustrating a sensing circuit according to a second embodiment of the present invention. FIG. 6B is a schematic timing waveform diagram illustrating associated signal processing in the sensing circuit shown in FIG. 6A. The sensing circuit s comprises an operation amplifier 600, a first feedback capacitor Ci1, a second feedback capacitor Ci2 and eight switches sw1~sw8.

A reference voltage Vref is inputted into the positive input terminal (+) of the operation amplifier 600. The first switch sw1 is controlled by a first control signal ctr1, and connected between the receiving electrode r and the negative input terminal (−) of the operation amplifier 600. The second switch sw2 is controlled by a second control signal ctr2, and connected between the negative input terminal (−) and the output terminal Vo of the operation amplifier 600. The third switch sw3 is controlled by a third control signal ctr3. A first terminal of the third switch sw3 is connected to the negative input terminal (−) of the operation amplifier 600. A second terminal of the third switch sw3 is connected to a first terminal of the first feedback capacitor Ci1. The fourth switch sw4 is controlled by a fourth control signal ctr4. A first terminal of the fourth switch sw4 is connected to a second terminal of the first feedback capacitor Ci1. A second terminal of the fourth switch sw4 is connected to the output terminal Vo of the operation amplifier 600. The fifth switch sw5 is controlled by a fifth control signal ctr5. A first terminal of the fifth switch sw5 is connected to the negative input terminal (−) of the operation amplifier 600. A second terminal of the fifth switch sw5 is connected to a first terminal of the second feedback capacitor Ci2. The sixth switch sw6 is controlled by a sixth control signal ctr6. A first terminal of the sixth switch sw6 is connected to a second terminal of the second feedback capacitor Ci2. A second terminal of the sixth switch sw6 is connected to the output terminal Vo of the operation amplifier 600. The seventh switch sw7 is controlled by a seventh control signal ctr7, and connected between the second terminal of the third switch sw3 and the output terminal Vo of the operation amplifier 600. The eighth switch sw8 is controlled by an eighth control signal ctr8, and connected between the second terminal of the first feedback capacitor Ci1 and the negative input terminal (−) of the operation amplifier 600. In this embodiment, the first feedback capacitor Ci1 and the second feedback capacitor Ci2 has the same capacitance value, which is equal to Ci/2.

As shown in FIG. 6B, a scanning cycle τ of the driving signal P includes a pre-charge cycle, a driving cycle T and an output cycle O. In each driving cycle T, the driving signal P generates three pulses t1, t2 and t3. The driving cycle T is followed by the output cycle O. The remaindering time is the pre-charge cycle. In response to the high-level states of the eight control signals ctr1~ctr8, the switches sw1~sw8 are in the close states. Whereas, in response to the low-level states of the eight control signals ctr1~ctr8, the switches sw1~sw8 are in the open states. Hereinafter, the operations of the sensing circuit s will be illustrated in more details with reference to FIGS. 6 and 7.

Figure 7A:
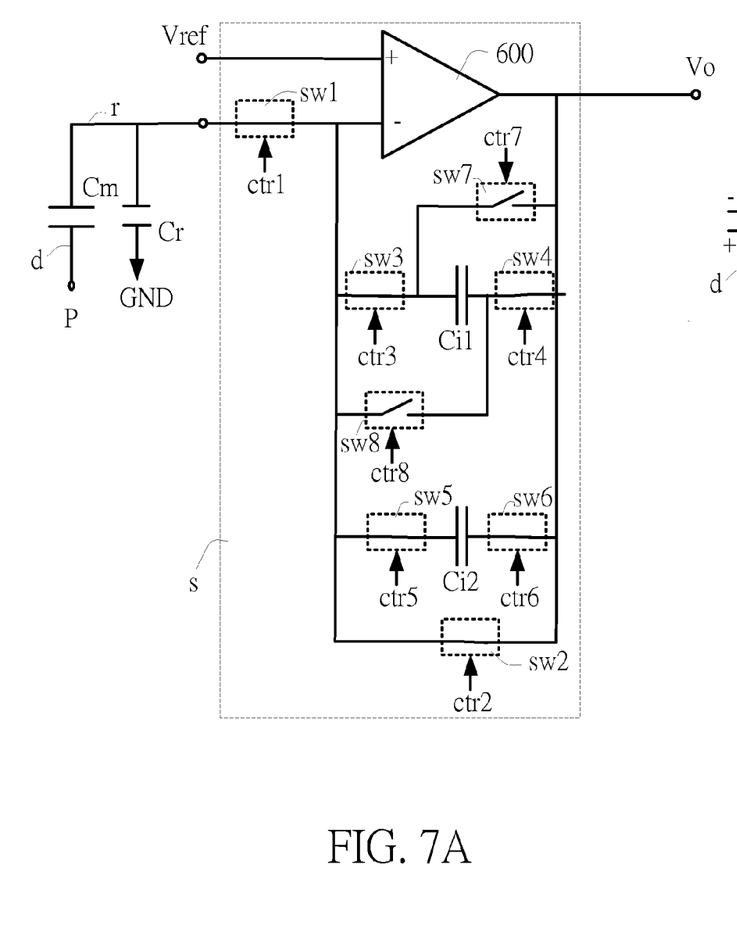
FIG. 7A is a schematic circuit diagram illustrating the sensing circuit of FIG. 6 during the pre-charge cycle.

FIG. 7A is a schematic circuit diagram illustrating the sensing circuit of FIG. 6A during the pre-charge cycle. During the pre-charge cycle, the switches sw1~sw6 are all in the close state, but the seventh switch sw7 and the eighth switch sw8 are in the open state. Since no pulse is generated during the pre-charge cycle and the both terminals of the first feedback capacitor Ci1 and the second feedback capacitor Ci2 are short-circuited, the charge quantity stored in the first feedback capacitor Ci1 and the second feedback capacitor Ci2 will be zero.

Figure 7B:
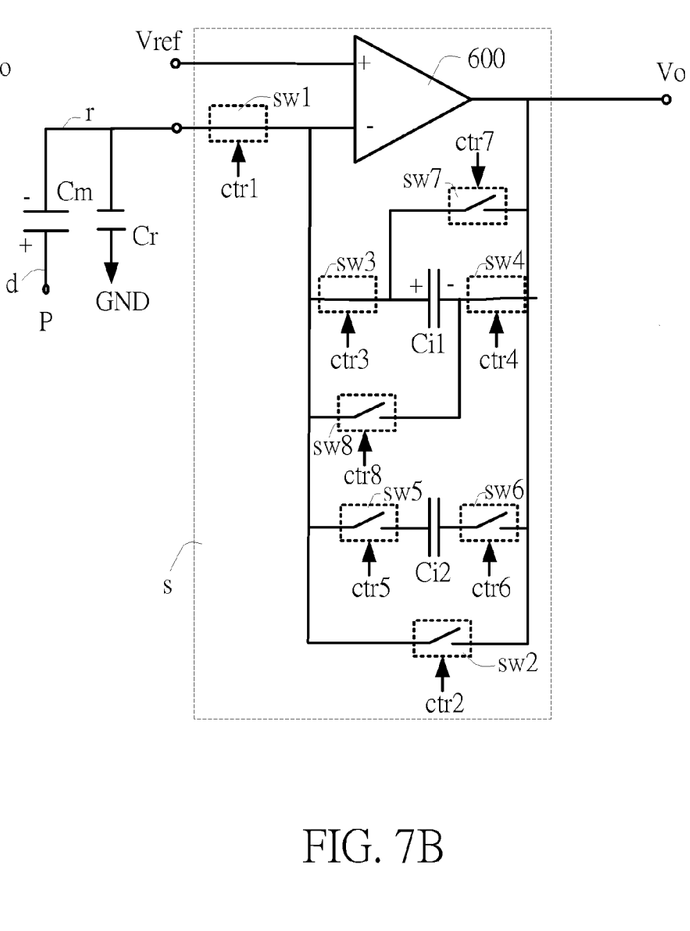
FIG. 7B is a schematic circuit diagram illustrating the sensing circuit of FIG. 6 during the former time interval t1a of the first pulse t1 of the driving cycle T.

FIG. 7B is a schematic circuit diagram illustrating the sensing circuit of FIG. 6A during the former time interval t1$a$ of the first pulse t1 of the driving cycle T. Please refer to FIGS. 6B and 7B. In the former time interval t1$a$ of the first pulse t1, the first pulse t1 is switched from the low-level state to the high-level state. Meanwhile, the first switch sw1, the third switch sw3 and the fourth switch sw4 are in the close state, but the second switch sw2 and the switches sw5~sw8 are in the open state.

As such, the mutual capacitance Cm generates coupling charge at the rising edge of the first pulse t1. Moreover, since the positive terminal (+) of the mutual capacitance Cm is connected to the driving electrode d and the negative terminal (−) of the mutual capacitance Cm is connected to the receiving electrode r, the first terminal of the first feedback capacitor Ci1 is a positive terminal (+) and the second terminal of the first feedback capacitor Ci1 is a negative terminal (−). According to the equation (I), the voltage drop across the first feedback capacitor Ci1 is obtained as: $\Delta Vo=2\times Vy\times Cm/Ci$.

Figure 7C:
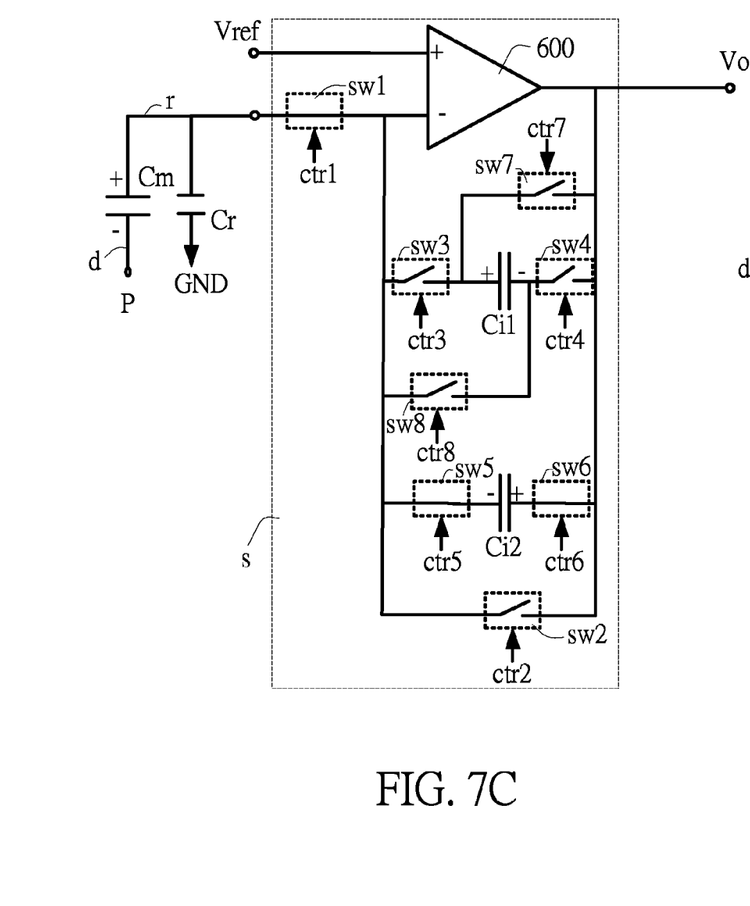
FIG. 7C is a schematic circuit diagram illustrating the sensing circuit of FIG. 6 during the latter time interval t1b of the first pulse t1 of the driving cycle T.

FIG. 7C is a schematic circuit diagram illustrating the sensing circuit of FIG. 6A during the latter time interval t1$b$ of the first pulse t1 of the driving cycle T. Please refer to FIGS. 6B and 7C. In the latter time interval t1$b$ of the first pulse t1, the first pulse t1 is switched from the high-level state to the low-level state. Meanwhile, the first switch sw1, the fifth switch sw5 and the sixth switch sw6 are in the close state, but the second switch sw2, the third switch sw3, the fourth switch sw4, the seventh switch sw7 and the eighth switch sw8 are in the open state.

As such, the mutual capacitance Cm generates coupling charge at the falling edge of the first pulse t1. Moreover, since the negative terminal (−) of the mutual capacitance Cm is connected to the driving electrode d and the positive terminal (+) of the mutual capacitance Cm is connected to the receiving electrode r, the first terminal of the second feedback capacitor Ci2 is a negative terminal (−) and the second terminal of the second feedback capacitor Ci2 is a positive terminal (+). According to the equation (I), the voltage drop across the second feedback capacitor Ci2 is obtained as: $\Delta Vo=2\times Vy\times Cm/Ci$.

As is understood from FIGS. 7B and 7C, the first feedback capacitor Ci1 is charged in a first charging direction from the first terminal to the second terminal in response to the rising edge of the first pulse t1 of the driving signal; and the second feedback capacitor Ci2 is charged in a second charging direction from the second terminal to the first terminal in response to the falling edge of the first pulse t1 of the driving signal.

Similarly, during the former time interval t2$a$ of the second pulse t2, the operating condition of the sensing circuit s is similar to that described in FIG. 7B. In addition, the first feedback capacitor Ci1 is charged from the first terminal to the second terminal, and the voltage drop across the first feedback capacitor Ci1 is obtained as: $\Delta Vo=4\times Vy\times Cm/Ci$. Similarly, during the latter time interval t2$b$ of the second pulse t2, the operating condition of the sensing circuit s is similar to that described in FIG. 7C. In addition, the second feedback capacitor Ci2 is charged from the second terminal to the first terminal, and the voltage drop across the second feedback capacitor Ci2 is obtained as: $\Delta Vo=4\times Vy\times Cm/Ci$.

Similarly, during the former time interval t3$a$ of the third pulse t3, the operating condition of the sensing circuit s is similar to that described in FIG. 7B. In addition, the first feedback capacitor Ci1 is charged from the first terminal to the second terminal, and the voltage drop across the first feedback capacitor Ci1 is obtained as: $\Delta Vo=6\times Vy\times Cm/Ci$. Similarly, during the latter time interval t3$b$ of the third pulse t3, the operating condition of the sensing circuit s is similar to that described in FIG. 7C. In addition, the second feedback capacitor Ci2 is charged from the second terminal to the first terminal, and the voltage drop across the second feedback capacitor Ci2 is obtained as: $\Delta Vo=6\times Vy\times Cm/Ci$.

Figure 7D:
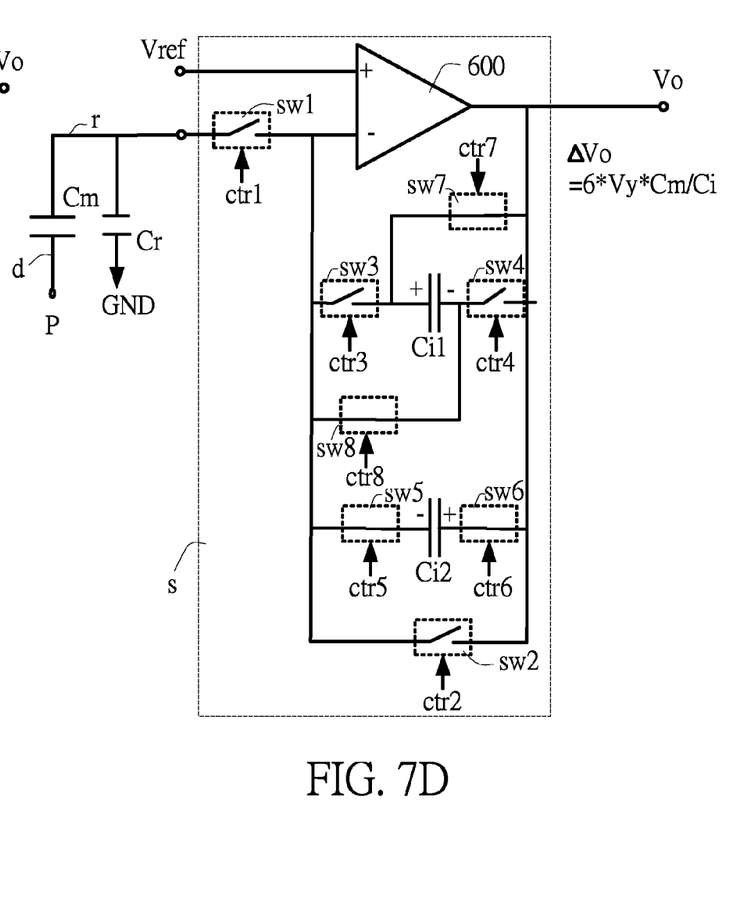
FIG. 7D is a schematic circuit diagram illustrating the sensing circuit of FIG. 6 during the output cycle O.

FIG. 7D is a schematic circuit diagram illustrating the sensing circuit of FIG. 6A during the output cycle O. Please refer to FIGS. 6B and 7D. During the output cycle O, the switches sw5~sw8 are in the close state, but the switches sw1~sw4 are in the open state.

Obviously, during the output cycle O, the first feedback capacitor Ci1 and the second feedback capacitor Ci2 are connected with each other in parallel. As such, the voltage drop at the output terminal Vo is obtained as: $\Delta Vo=6\times Vy\times Cm/Ci$. In other words, in a case that N pulses are generated during the driving cycle T, the voltage drop at the output terminal Vo is obtained as: $\Delta Vo=2N\times Vy\times Cm/Ci$.

In the second embodiment, the voltage drop at the output terminal of the sensing circuit s increases during the output cycle. As such, since the voltage drop resulted from the touch point and the voltage drop resulted from the untouched point are distinguished, the backend circuit can easily realize the actual position of the touch point according to the change of the voltage drop.

Figure 8A:
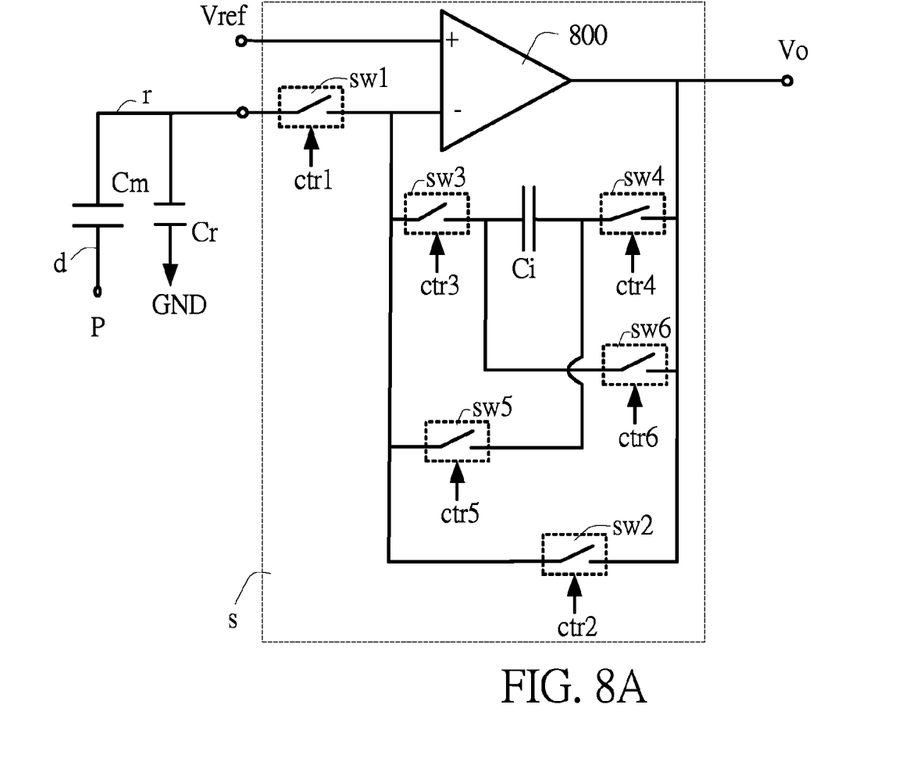
FIG. 8A is a schematic circuit diagram illustrating a sensing circuit according to a third embodiment of the present invention.
Figure 8B:
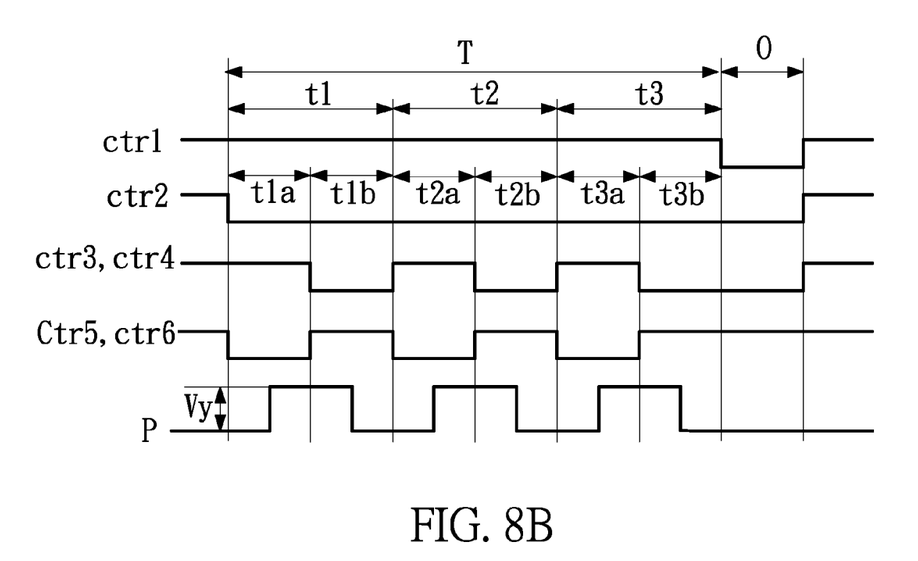
FIG. 8B is a schematic timing waveform diagram illustrating associated signal processing in the sensing circuit shown in FIG. 8A.

FIG. 8A is a schematic circuit diagram illustrating a sensing circuit according to a third embodiment of the present invention. FIG. 8B is a schematic timing waveform diagram illustrating associated signal processing in the sensing circuit shown in FIG. 8A. The sensing circuit s comprises an operation amplifier 800, a feedback capacitor Ci, and six switches sw1~sw6.

A reference voltage Vref is inputted into the positive input terminal (+) of the operation amplifier 800. The first switch sw1 is controlled by a first control signal ctr1, and connected between the receiving electrode r and the negative input terminal (−) of the operation amplifier 800. The second switch sw2 is controlled by a second control signal ctr2, and connected between the negative input terminal (−) and the output terminal Vo of the operation amplifier 800. The third switch sw3 is controlled by a third control signal ctr3. A first terminal of the third switch sw3 is connected to the negative input terminal (−) of the operation amplifier 800. A second terminal of the third switch sw3 is connected to a first terminal of the feedback capacitor Ci. The fourth switch sw4 is controlled by a fourth control signal ctr4. A first terminal of the fourth switch sw4 is connected to a second terminal of the feedback capacitor Ci. A second terminal of the fourth switch sw4 is connected to the output terminal Vo of the operation amplifier 800. The fifth switch sw5 is controlled by a fifth control signal ctr5, and connected between the negative input terminal (−) of the operation amplifier 800 and the second terminal of the feedback capacitor Ci. The sixth switch sw6 is controlled by a sixth control signal ctr6, and connected between the output terminal Vo of the operation amplifier 800 and the first terminal of the feedback capacitor Ci.

As shown in FIG. 8B, a scanning cycle τ of the driving signal P includes a pre-charge cycle, a driving cycle T and an output cycle O. In each driving cycle T, the driving signal P generates three pulses t1, t2 and t3. The driving cycle T is followed by the output cycle O. The remaindering time is the pre-charge cycle. In response to the high-level states of the six control signals ctr1~ctr6, the switches sw1~sw6 are in the close states. Whereas, in response to the low-level states of the eight control signals ctr1~ctr6, the switches sw1~sw6 are in the open states. Hereinafter, the operations of the sensing circuit s will be illustrated in more details with reference to FIGS. 8 and 9.

Figure 9A:
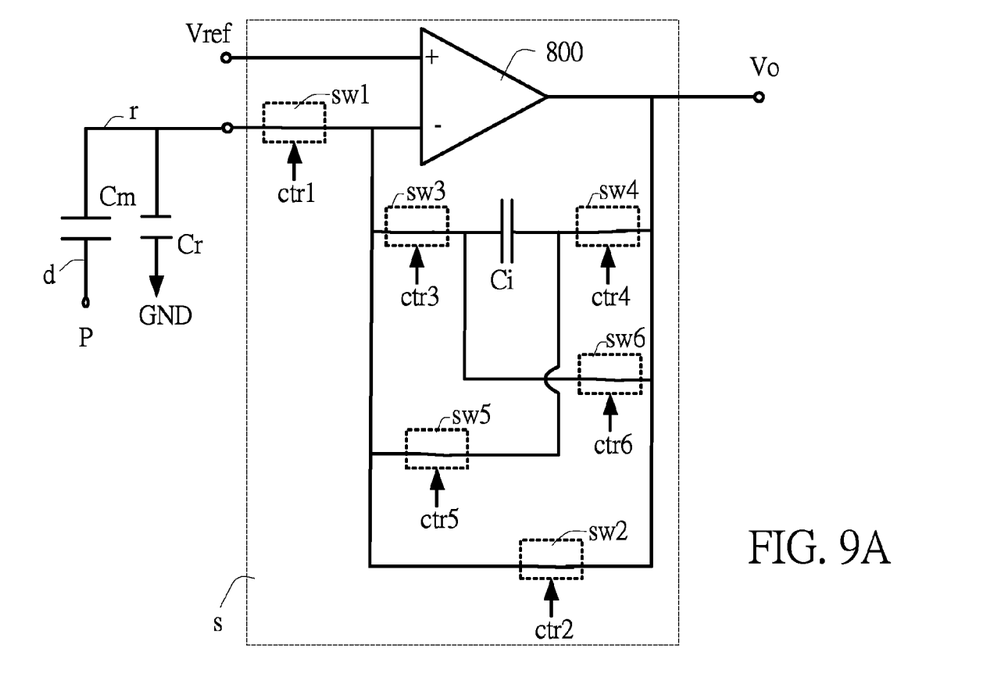
FIG. 9A is a schematic circuit diagram illustrating the sensing circuit of FIG. 8 during the pre-charge cycle.

FIG. 9A is a schematic circuit diagram illustrating the sensing circuit of FIG. 8A during the pre-charge cycle. During the pre-charge cycle, the switches sw1~sw6 are all in the close state. Since no pulse is generated during the pre-charge cycle and the both terminals of the feedback capacitor Ci are short-circuited, the charge quantity stored in the feedback capacitor Ci will be zero.

Figure 9B:
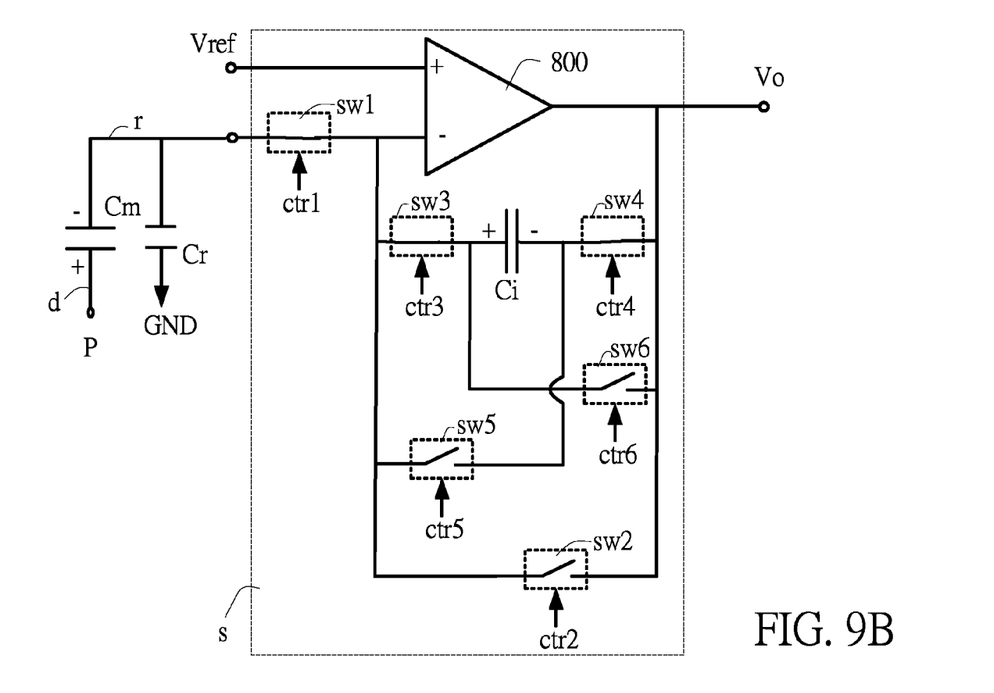
FIG. 9B is a schematic circuit diagram illustrating the sensing circuit of FIG. 8 during the former time interval t1a of the first pulse t1 of the driving cycle T.

FIG. 9B is a schematic circuit diagram illustrating the sensing circuit of FIG. 8A during the former time interval t1$a$ of the first pulse t1 of the driving cycle T. Please refer to FIGS. 8B and 9B. In the former time interval t1$a$ of the first pulse t1, the first pulse t1 is switched from the low-level state to the high-level state. Meanwhile, the first switch sw1, the third switch sw3 and the fourth switch sw4 are in the close state, but the second switch sw2, the fifth switch sw5 and the sixth switch sw6 are in the open state.

As such, the mutual capacitance Cm generates coupling charge at the rising edge of the first pulse t1.

Moreover, since the positive terminal (+) of the mutual capacitance Cm is connected to the driving electrode d and the negative terminal (−) of the mutual capacitance Cm is connected to the receiving electrode r, the first terminal of the feedback capacitor Ci is a positive terminal (+) and the second terminal of the feedback capacitor Ci is a negative terminal (−). According to the equation (I), the voltage drop across the feedback capacitor Ci is obtained as: $\Delta Vo = Vy \times Cm/Ci$.

Figure 9C:
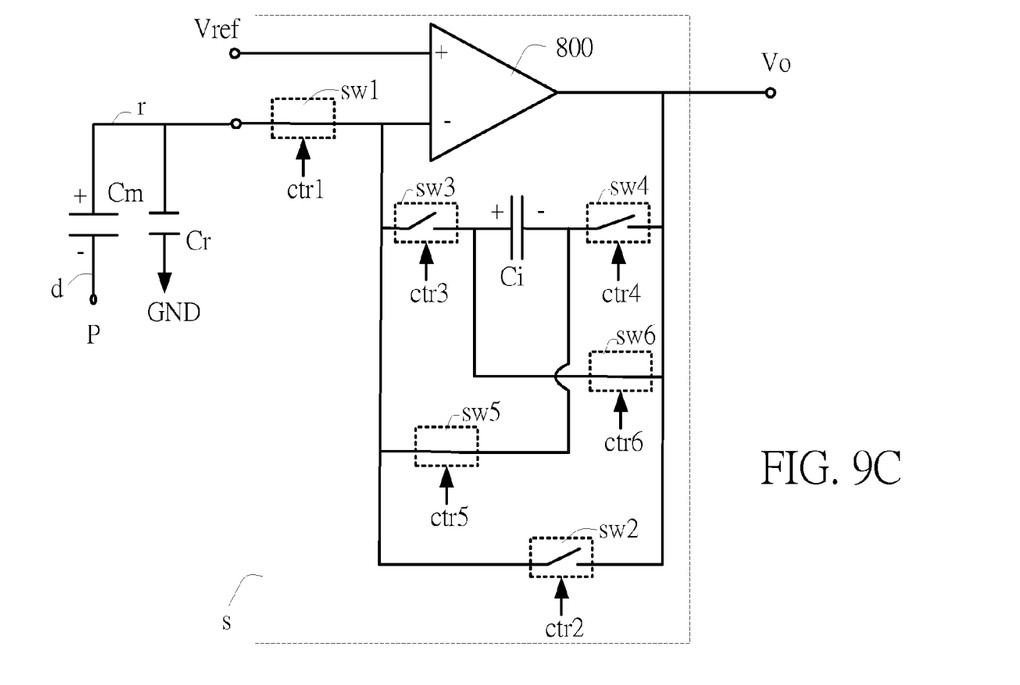
FIG. 9C is a schematic circuit diagram illustrating the sensing circuit of FIG. 9 during the latter time interval t1b of the first pulse t1 of the driving cycle T.

FIG. 9C is a schematic circuit diagram illustrating the sensing circuit of FIG. 8A during the latter time interval t1$b$ of the first pulse t1 of the driving cycle T. Please refer to FIGS. 8B and 9C. In the latter time interval t1$b$ of the first pulse t1, the first pulse t1 is switched from the high-level state to the low-level state. Meanwhile, the first switch sw1, the fifth switch sw5 and the sixth switch sw6 are in the close state, but the second switch sw2, the third switch sw3 and the fourth switch sw4 are in the open state.

As such, the mutual capacitance Cm generates coupling charge at the falling edge of the first pulse t1. Moreover, since the negative terminal (−) of the mutual capacitance Cm is connected to the driving electrode d and the positive terminal (+) of the mutual capacitance Cm is connected to the receiving electrode r, the second terminal of the feedback capacitor Ci is a negative terminal (−) and the first terminal of the feedback capacitor Ci is a positive terminal (+). According to the equation (I), the voltage drop across the feedback capacitor Ci is accumulated as: $\Delta Vo = 2 Vy \times Cm/Ci$.

Similarly, during the former time interval t2$a$ of the second pulse t2, the operating condition of the sensing circuit s is similar to that described in FIG. 9B. In addition, the voltage drop across the feedback capacitor Ci is obtained as: $\Delta Vo = 3 \times Vy \times Cm/Ci$. Similarly, during the latter time interval t2$b$ of the second pulse t2, the operating condition of the sensing circuit s is similar to that described in FIG. 9C. In addition, the voltage drop across the feedback capacitor Ci is obtained as: $\Delta Vo = 4 \times Vy \times Cm/Ci$.

Similarly, during the former time interval t3$a$ of the third pulse t3, the operating condition of the sensing circuit s is similar to that described in FIG. 9B. In addition, the voltage drop across the feedback capacitor Ci is obtained as: $\Delta Vo = 5 \times Vy \times Cm/Ci$. Similarly, during the latter time interval t3$b$ of the third pulse t3, the operating condition of the sensing circuit s is similar to that described in FIG. 9C. In addition, the voltage drop across the feedback capacitor Ci is obtained as: $\Delta Vo = 6 \times Vy \times Cm/Ci$.

Figure 9D:
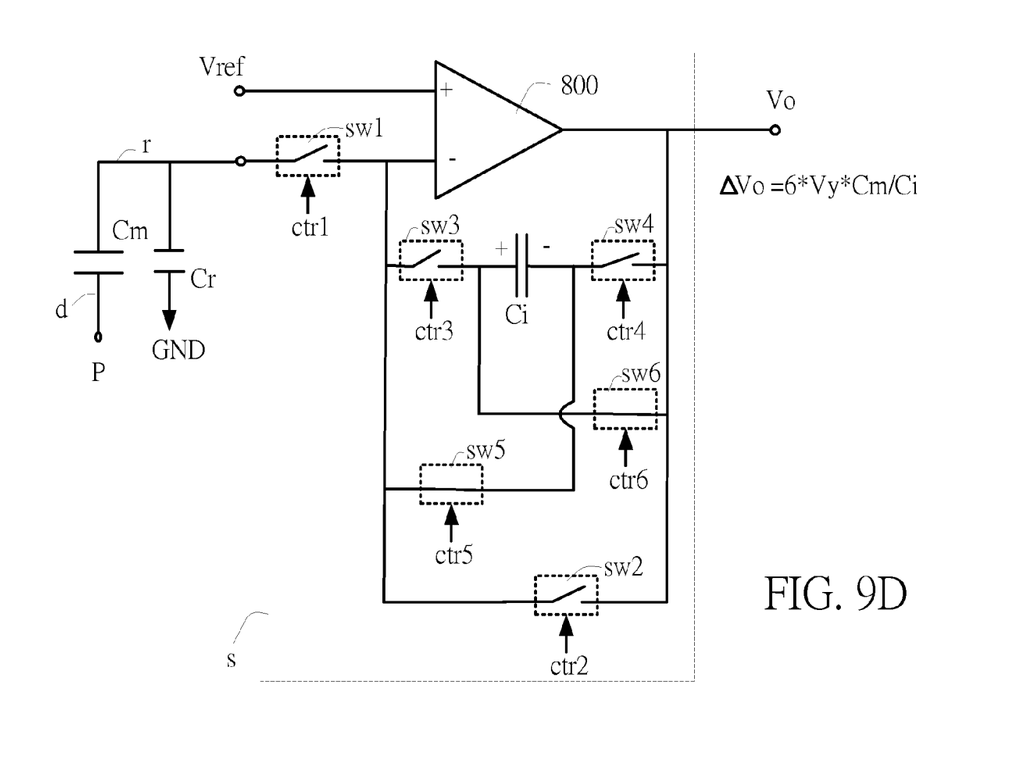
FIG. 9D is a schematic circuit diagram illustrating the sensing circuit of FIG. 9 during the output cycle O.

FIG. 9D is a schematic circuit diagram illustrating the sensing circuit of FIG. 8A during the output cycle O. Please refer to FIGS. 8B and 9D. During the output cycle O, the fifth switches sw5 and the sixth switch sw6 are in the close state, but the switches sw1~sw4 are in the open state.

Obviously, during the output cycle O, the voltage drop at the output terminal Vo is obtained as: $\Delta Vo = 6 \times Vy \times Cm/Ci$. In other words, in a case that N pulses are generated during the driving cycle T, the voltage drop at the output terminal Vo is obtained as: $\Delta Vo = 2N \times Vy \times Cm/Ci$.

In the third embodiment, the voltage drop at the output terminal of the sensing circuit s increases during the output cycle. As such, since the voltage drop resulted from the touch point and the voltage drop resulted from the untouched point are distinguished, the backend circuit can easily realize the actual position of the touch point according to the change of the voltage drop.

In the first and second embodiments, the sensing circuit of the capacitive touch panel comprises at least two feedback capacitors. In response to a rising edge of the pulse during the driving cycle, the first feedback capacitor is charged in a first charging direction, so that the coupling charge generated by the mutual capacitance is stored in the first feedback capacitor. In response to a falling edge of the pulse during the driving cycle, the second feedback capacitor is charged in a second charging direction, so that the coupling charge generated by the mutual capacitance is stored in the second feedback capacitor. During the output cycle, the first feedback capacitor and the second feedback capacitor are connected with each other in parallel or in series, so that a voltage drop is generated at the output terminal.

In the third embodiment, the sensing circuit of the capacitive touch panel comprises a feedback capacitor. In response to a rising edge or a falling edge of the pulse during the driving cycle, the feedback capacitor is charged in the same charging direction, so that the coupling charge generated by the mutual capacitance is stored in the feedback capacitor. During the output cycle, a voltage drop is generated at the output terminal according to a voltage across the feedback capacitor.

From the above description, the sensing circuit of the capacitive touch panel of the present invention is capable of generating a high voltage drop at the output terminal. As a consequence, the signal-to-noise ratio (SNR) is increased. Moreover, since the negative input terminal (−) of the operation amplifier of the sensing circuit is stably maintained at the reference voltage Vref, the equivalent capacitance Cr that is connected between the receiving electrode r and the ground terminal GND has no influence on the voltage drop. In this situation, the parasitic capacitance effect is eliminated.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sensing circuit for use with a receiving electrode of a capacitive touch panel, a mutual capacitance having a first terminal connected to a driving electrode of the capacitive touch panel and having a second terminal connected to the receiving electrode, the driving electrode receiving a driving signal, the sensing circuit comprising:

an operation amplifier having a positive input terminal, a negative input terminal and an output terminal, wherein a reference voltage is inputted into the positive input terminal of the operation amplifier;

a first switch having a first terminal connected to the receiving electrode and the second terminal of the mutual capacitance and having a second terminal connected to the negative input terminal of the operation amplifier;

a second switch connected between the negative input terminal and the output terminal of the operation amplifier;

a feedback capacitor;

a third switch having a first terminal connected to the negative input terminal of the operation amplifier and a second terminal connected to a first terminal of the feedback capacitor;

a fourth switch having a first terminal connected to a second terminal of the feedback capacitor and a second terminal connected to the output terminal of the operation amplifier;

a fifth switch connected between the second terminal of the feedback capacitor and the negative input terminal of the operation amplifier;

a sixth switch connected between the first terminal of the feedback capacitor and the output terminal of the operation amplifier; and a sensing circuit output terminal;

wherein the driving signal generates at least one pulse during a driving cycle, at a time of a rising edge of the pulse, the first switch, the third switch and the fourth switch are controlled to be in a close state, but the second switch, the fifth switch and the sixth switch are controlled to be in an open state; at a time of a falling edge of the pulse, the first switch, the fifth switch and the six switch are controlled to be in a close state, but the second switch, the third switch and the fourth switch are controlled to be in an open state, and the feedback capacitor is charged in a first charging direction;

wherein said sensing circuit output terminal directly connects to said second switch, said forth switch, and sixth switch; and wherein said third switch and said forth switch change states synchronously, and said fifth switch and said sixth switch change states synchronously.

2. The sensing circuit according to claim 1 wherein the feedback capacitor is charged in the first charging direction from the first terminal to the second terminal of the feedback capacitor.

3. The sensing circuit according to claim 1 wherein each pulse includes a first time interval and a second time interval, the rising edge of the pulse switched from a low-level state to a high-level state is within the first time interval, and the falling edge of the pulse switched from the high-level state to the low-level state is within the second time interval, wherein in the first time interval, the first switch, the third switch and the fourth switch are controlled to be in the close state, but the second switch, the fifth switch and the sixth switch are controlled to be in the open state.

4. The sensing circuit according to claim 3 wherein in the second time interval, the first switch, the fifth switch and the six switch are controlled to be in a close state, but the second switch, the third switch and the fourth switch are controlled to be in an open state.

5. The sensing circuit according to claim 1 wherein during a pre-charge cycle of the driving signal, the first switch, the second switch, the third switch and the fourth switch are controlled to be in a close state, so that the charge quantity stored in the feedback capacitor is zero.

6. The sensing circuit according to claim 1 wherein during an output cycle of the driving signal, a voltage drop is generated at the output terminal of the operation amplifier by the feedback capacitor.

7. The sensing circuit according to claim 6 wherein during the output cycle of the driving signal, the fifth switch and the sixth switch are controlled to be in the close state, but the first switch, the second switch, the third switch and the fourth switch are controlled to be in the open state.

8. The sensing circuit according to claim 6 wherein if the driving signal generates one pulse during the driving cycle, the voltage drop is equal to a third voltage value, wherein if the driving signal generates N pulses during the driving cycle, the voltage drop is equal to N times as large as the third voltage value.

9. The sensing circuit according to claim 8 wherein the third voltage value is equal to $(2V_y \times C_m/C_i)$, $V_y$ is an amplitude of the pulses, $C_i$ is a capacitance value of the feedback capacitor, and $C_m$ is a capacitance value of the mutual capacitance.

* * * * *